United States Patent
Walsh

[15] 3,681,747
[45] Aug. 1, 1972

[54] SEA BOTTOM SLOPE MEASURING APPARATUS

[72] Inventor: George M. Walsh, Middletown, R.I.

[73] Assignee: Raytheon Company, Lexington, Mass.

[22] Filed: July 6, 1970

[21] Appl. No.: 56,129

Related U.S. Application Data

[63] Continuation of Ser. No. 776,722, Nov. 18, 1968, abandoned.

[52] U.S. Cl. ............... 340/3 R, 340/3 F, 343/5 CM, 343/16 R
[51] Int. Cl. .......................... G01s 9/66, G01s 3/00
[58] Field of Search ..... 340/1 R, 3 F, 3 R; 343/5 CM, 343/5 PC, 16 R

[56] References Cited

UNITED STATES PATENTS 3,144,631  8/1964  Lustig et al. ................ 340/3
3,273,148  9/1966  Wood et al. ................ 340/3 X Primary Examiner—Richard A. Farley
Attorney—Harold A. Murphy and Joseph D. Pannone

[57] ABSTRACT

Sea bottom slope is measured by projecting an acoustic beam upon the sea bottom with reference to a local vertical and measuring the arrival angle between incident echos and the local vertical. Split receiving beams having separated phase centers are utilized to measure the arrival angle. In order to reduce the effects of noise, phase angle magnitude and sign are determined by signal processing means which utilize a greater proportion of the available energy in large time bandwidth product signals.

13 Claims, 4 Drawing Figures

SYSTEM GEOMETRY

INVENTOR
GEORGE M. WALSH
Robert Bruce Brodie
ATTORNEY

TRANSMITTING AND RECEIVING ARRAY

BEARING DEVIATION INDICATOR RESPONSE CHARACTERISTIC

SEA BOTTOM SLOPE MEASURING APPARATUS

This is a continuation of application Ser. No. 776,722, filed Nov. 18, 1968 and now abandoned.

BACKGROUND OF THE INVENTION

The invention described herein was made in the course of or under a contract for the Department of the Navy.

This invention relates to sea bottom slope measuring apparatus and, more particularly, to sea bottom slope measuring apparatus used with precise underwater mapping operations.

In the prior art, as for example shown, in U. S. Pat. No. 2,629,082 issued to D. G. C. Hare on Feb. 17, 1953, it was broadly known that a bottom slope measurement could be obtained by measuring the difference in transit time from an acoustic beam projected onto the sea bottom with reference to a pair of spaced acoustic receivers. The apparatus described by the reference required that the acoustic receivers be laterally disposed in respect to the transmitter for measuring tilt in the direction of movement of the apparatus. Such a prior art device at best obtains only a crude value of slope or tilt and is apparently limited to operation near the surface to be measured. No relationship is described between the projected beam angle, the spacing between the acoustic receivers, nor the effects of noise upon the observed measurements.

Existing practice in the measurement of bottom slope requires that precise slope trend information be obtained from the trend of consecutive transmissions. An additional disadvantage is that slopes having gradients perpendicular to the direction of travel of the measuring apparatus cannot, in fact, be measured.

It is accordingly an object of this invention to devise a bottom slope measuring apparatus in which precision measurements of average bottom slope in the region of the sea bottom illuminated by an acoustic beam can be obtained on each distinct measurement, rather than, requiring the trend measurement of consecutive transmissions.

It is another object of this invention to devise a bottom slope measuring apparatus that possesses a fine degree of areal resolution.

It is still another object of this invention to obtain sea bottom slope measurements in high noise environments and to further include a verification and reliability capacity as the measurements are being made.

It is yet another object of this invention to devise an apparatus which measures sea bottom slope components at great depths and in at least two orthogonal directions simultaneously.

SUMMARY OF THE INVENTION

The aforementioned objects of this invention are satisfied in an embodiment in which a beam of acoustic energy is projected upon the sea bottom with reference to a local vertical. Also included are means for measuring the arrival angle between the sea bottom echos and the local vertical. These measured angles are taken as being proportional to the slope angle. The arrival angle is related to the time or phase difference of the incident echo upon a beam former which has a pair of phase centers separated by a predetermined distance for each orthorgonal component of sea bottom slope being measured.

The arrival angle measurement means comprise means for generating a first signal magnitude which varies as the phase angle difference between coherent first and second receiving beams. Thus, as long as signals have a detectable coherency, such as ascertained from 0-axis crossings, then measurements can be made upon them. Also included are means for generating a second signal magnitude which varies as the average signal-to-noise ratio of the coherent first and second receiving beams. A utilization circuit can then be coupled to these means and made responsive to the first and second signal magnitudes for indication of bottom slope components and a reliability measure of the indicated data.

Both the first and second signal magnitude means are in the form of correlation devices each in series with a corresponding integrator. Thus, an integrated output from each device will be present only when there is coherency between the signals applied to the correlation unit.

The first signal magnitude means includes means for phase shifting the first receiving beam 90° with respect to the second receiving beam in order to permit ascertainment of the sign of the angle. The utilization circuit may include a variable gain amplifying device whose input is coupled to the first and second signal magnitude means. The gain of the amplifying device varies as the sum of the integrated outputs between the absolute value of the first signal magnitude and the integrated output of the second signal magnitude.

DESCRIPTION OF THE PREFERRED EMBODIMENT

Figure 1:
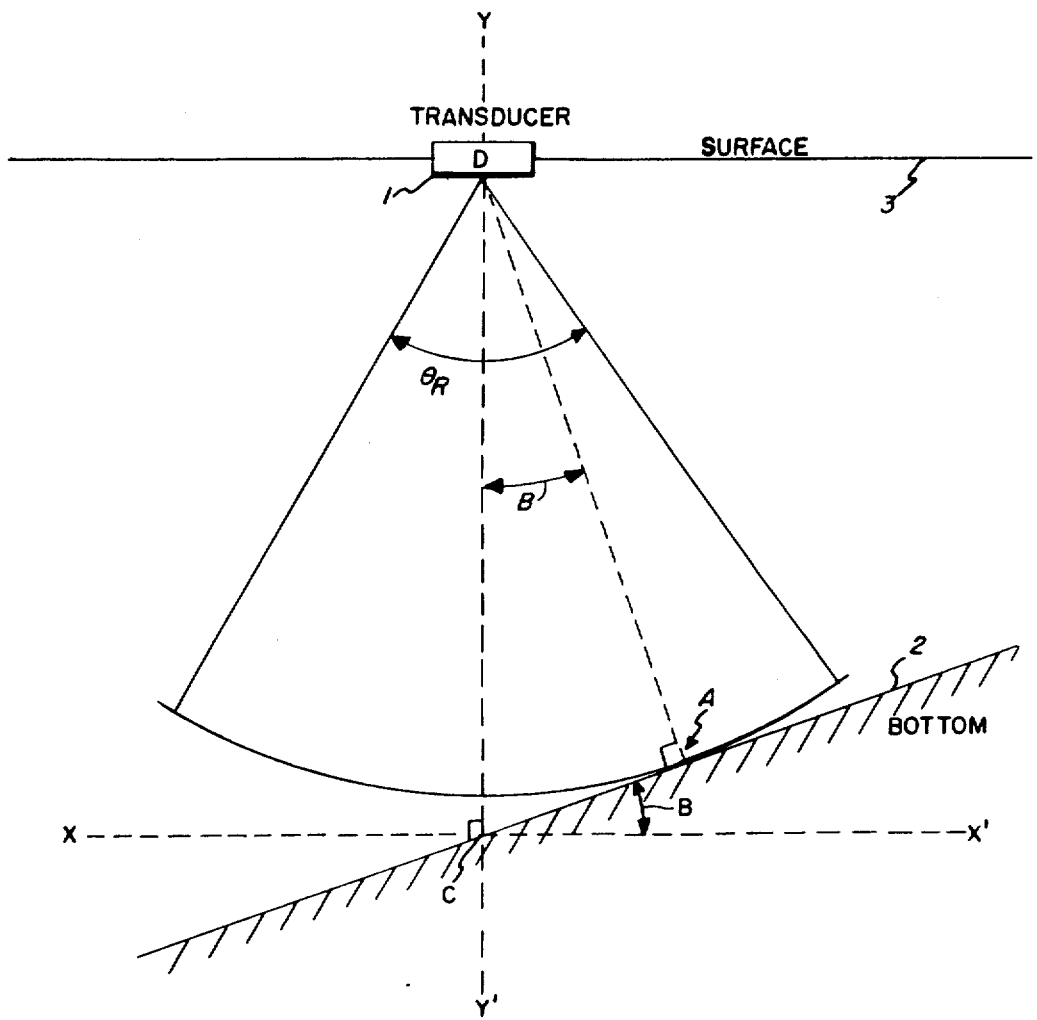
FIG. 1 shows the system geometry between a transducer and the sea bottom slope.

As shown in FIG. 1, a split or half beam transducer 1 projects a pair of transmitting and receiving beams of width $\theta_m$ with reference to a local vertical $y$-$y'$ upon sea bottom slope 2. The sea bottom slope 2 makes an angle B with reference to a local horizontal $x$-$x'$ at the point of intersection C between the local vertical $y$-$y'$ and bottom slope 2. Transducer 1 projects a beam having an angle greater than the slope angle so that echo signals may come within the receiving beam width.

Transducer 1 may be considered a point acoustic source generating spherical sound pressure field phase fronts in the far field. For a bottom having a slope B the phase front of the acoustic beam will first touch and be perpendicular to bottom 2 at point A. Since triangle CAD is a right triangle and angle $x'$CD is a right triangle, then, in turn, angle ACD is 90° minus B while angle CDA is equal to B.

The reflected energy seen at the receiver will appear to be coming from a point located at relative bearing B. This angle is measured by the system shown in block diagram 4 in FIG. 2.

Figure 2:
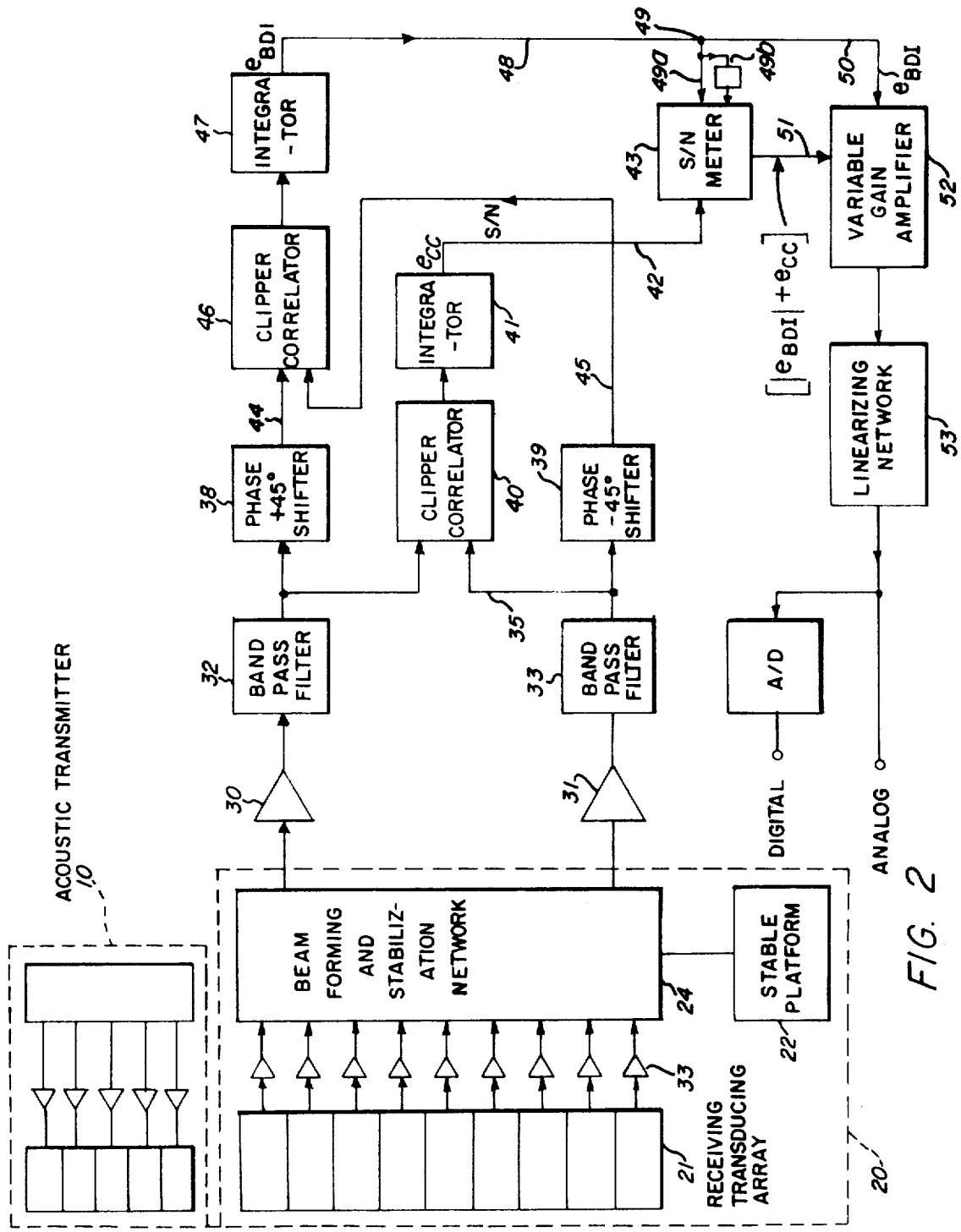
FIG. 2 shows a block diagram of the sea bottom slope measuring apparatus according to the invention.

As shown in FIG. 2, acoustic transmitter 10 projects a pair of half beams upon the sea bottom. An arrangement 20, duly compensated for ship's motion, receives energy in the receiving half beams and applies them to amplifiers 30 and 31 respectively. The receiving arrangement 20 comprises a transducing array 21 consisting of individual acoustic elements responsive to incident compressional energy for driving corresponding one of amplifiers 33 into a beam forming and stabilization network 24. As previously mentioned, mechanical or electrical stabilization of the beams to offset the effect of ship's motion may be introduced into this network with reference to a stable inertial platform gyroscopically driven and computer controlled if need be. Such networks and techniques are broadly well known in the art and are not described here in order again to simplify description. Sufficeth to say that each half beam, designated respectively first and second beam, applies electrical representations of the incident compressional waves in the form of signals upon amplifiers 30 and 31. The first and second beams have their signals cleaned by applying them respectively to bandpass filters 32 and 33.

At this point in the description, two broad functional aspects of the invention should be mentioned. The first aspect is that of measurement of the angle of arrival and the second is compensating or reducing the effects of noise. The measurement of the angle of arrival is performed by a bearing deviation indicator (BDI). This comprises phase shifters 38 and 39 together with clipper correlator 46 and integrator 47. The reduction of the effects of noise is accomplished by clipper correlator 40, integrator 41, signal-to-noise meter 43, and variable gain amplifier 52. Attention next will be directed to the acoustic receiving and transmitting array shown in FIG. 3 followed by a more detailed discussion and analysis of the embodiment shown in FIG. 2.

Figure 3:
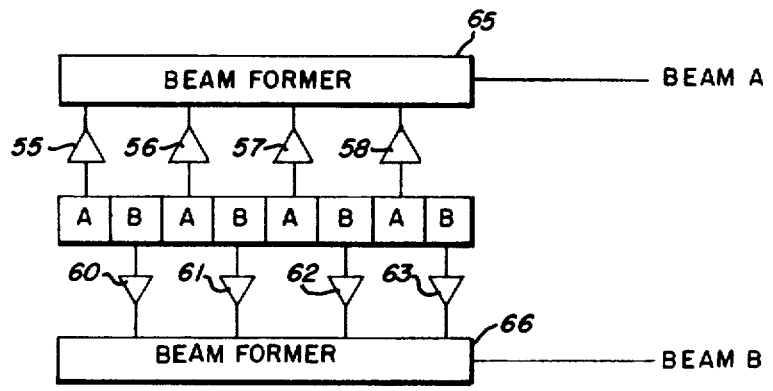
FIG. 3 shows a transmitting and receiving array for generating split or half acoustic beams.

FIG. 3 shows an embodiment of the receiving and transmitting array in which alternate acoustic energy elements in array 59 drive beam former 54 through corresponding amplification elements 55 through 58. Likewise, other signal elements B shape a beam in beam former 64 through amplification element 60 through 63. The half beam arrays may be partially Overlapped. The phase center of such an overlapped array may be in the order of an element spacing. Sufficient aperture is, however, available for each beam to still be highly directive. The choice of the exact combination of elements and element shading depends of the characteristics of the particular beam being employed. The intent of utilizing overlapping of the beams is to produce an output voltage from the corresponding BDI which contains no ambiguities in measurement of bearing angles over a range of bearings which include the first several side lobes of the array.

As mentioned earlier, the BDI is a device for determining the angle of arrival of incident acoustic beams. It comprises clipper correlator 46 driving integrator 47. The acoustic signals are representing the first and second receiving beams and are applied to phase shifter 38 and 39 respectively. The clipper correlator 46 generates a signal e which has a maximum amplitude E. It has been empirically determined that the signal e may be related to deviation angle B by a relationship which includes received signal power magnitude S, noise power magnitude N, input bandwidth $\Delta f$, and arithmetic center frequency $f_0$.

The time delay between phase centers, that is, the time delay between signals appearing on conductors 36 and 37 is equal to $d/c \sin B$ where $d$ is the distance between the phase center half beams, $c$ is the velocity of sound, and B is the angle of arrival to a local vertical.

With this introduction, the exact relationship between e and B is:

$$e = \left(\frac{2E}{\pi}\right)\sin^{-1}\left[\left(\frac{S}{S+N}\right)\sin\left(\frac{\pi\Delta f d \sin B}{c}\right)\sin\left(\frac{2\pi f_0 d \sin B}{c}\right)\middle/\frac{\pi\Delta f d \sin B}{c}\right]$$

Figure 4:
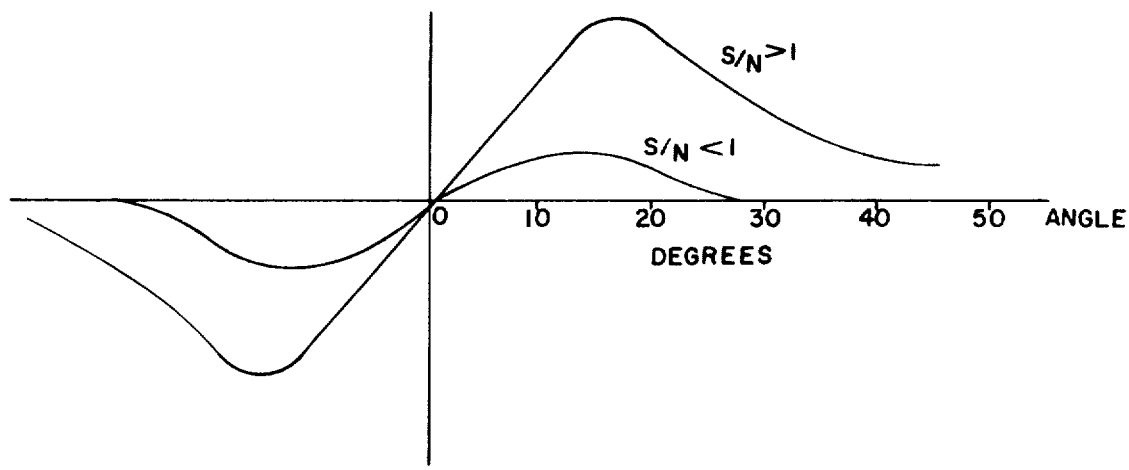
FIG. 4 shows a characteristic curve of a voltage output of a bearing deviation indicator versus angle of arrival or incidence of an echo wave upon the transducer with reference to a local vertical.

FIG. 4 shows the characteristic curve of a bearing deviation indicator according to the invention. The output signal approximates zero or a low value for small deviations about the normal. In contrast, a high magnitude signal appears for substantial deviation angles. The difference in the curves represents the combination of the $S/(S+N)$ in the above equation and the effect of the half beam spatial response. At a high signal-to-noise ratio the normalizing action of the correlation clippers tends to minimize the amplitude weighting of the beam pattern. At low $S/N$ the effective $S/N$ decreases off-axis due to the beam pattern causing the BDI output to decrease very rapidly.

First beam signals are applied through bandpass filter 32 to phase shifter 38 over path 36. Second beam signals are applied to bandpass filter 33 through phase shifter 39 over path 37. The phase relation between first beam signals on path 44 is 90° with respect to second beam signals on path 45. Clipper correlator 46 is broadly in the nature of an auto or cross correlation receiver and may be constructed according to an article entitled, "Correlators for SIgnal Reception" by J. J. Faran, Jr. and J. R. Hills, Technical Memorandum No. 27, Acoustic Research Laboratory of the Harvard University in Cambridge, Massachusetts, dated Sept. 15, 1952. The output of correlator 46 will be a positive or negative magnitude DC voltage. This is applied to integrator 47. Integrator 47 is selected to have a sufficiently long time constant so as to filter out random signal variations. The output of integrator 47 $e_{BDI}$ is applied over path 48 to signal-to-noise meter 43 and a variable gain amplifier 52.

Simultaneous with the application of first and second beam signals to the BDI, signals from bandpass filters 32 and 33 are respectively applied to clipper correlator 40 as inputs A and B. Clipper correlator 40 is of the same type and construction as clipper correlator 46. It also is terminated in an integrator 41. Because the input signals are not phase shifted, the output of clipper correlator 40 effectively gives an average signal-to-noise value with respect to its input signals as integrated through integrator 41. $S/N$ meter 43 derives a signal which is used to vary the gain of variable gain amplifier 52. This is applied to amplifier 52 over path 51. The control signal is the absolute value of $e_{BDI}$ combined with $e_{CC}$. This is mathematically expressed as $|e_{BDI}| + e_{CC}$. The variable gain amplifier 52 is responsive to the BDI signal on path 50. The amplifier gain varies inversely with the signal on control input 51.

S/N meter 43 may be formed from a conventional resistor adder network. This may be instrumented by terminating the $e_{BDI}$ output on line 48 and the inverse of this signal in a respective diode resistive network branch. The diodes would both be poled in the same direction. Similarly, the output from integrator 41 would be terminated on path 42 in a resistor joined to the common node of the resistive branches representing signals on 49a and 49b respectively. Such a diode resistive adder would form the sum of the absolute value of $e_{BDI}$ with the algebraic variation of $e_{CC}$. Variable gain amplifier 52 may be instrumented by any one of a number of well known varieties of automatic volume control circuits which include variable $\mu$ tubes. In this regard, reference is made to Electronic Circuits by Martin, Prentice Hall, page 407, 1955, New York.

Linearizing network 53 consists of any piece-wise continuous resistive diode chain having a voltage characteristic designed to compensate for the nonlinearity in the $|e_{BDI}|$ characteristic as shown, for example, in FIG. 4. The outputs of the linearizing network may be selectively used to drive an analog-to-digital converter or an analog responsive circuit. The following paragraphs are directed to considering the dynamic aspect of the performance of the measuring apparatus set forth in FIG. 2. As indicated, noise output is a function of S/N and input bandwidth W. In general, noise is a decreasing factor of S/N.

The BDI output signal level on conductor 48 is a function of arrival angle B and also S/N. A correction must therefore be made for S/N ratio. This may be done by combining the outputs of the BDI and an S/N averager, in this case, the output from integrator 41.

Reference is made to the relationship of the $e_{BDI}$ output on page 7, line 8. Let T equal the time delay between phase centers. Thus, T may be set equal to $(d \sin B)/c$, wherever it appears in the BDI output relationship. This simplifies the output relationship such that $$e_{BDI} = \frac{2E}{\pi} \sin^{-1}\left[\frac{(S)}{S+N} \frac{(\sin \pi WT)}{\pi WT} \sin 2\pi f_0 T\right]$$

The fluctuation component may be represented by $$\sigma_{AC} = 0.735 E \left[\frac{\Delta f_0}{W}\right]^{1/2} F\left(\frac{S}{N}; W; f_0\right)$$

In this relationship $f_0$ is the output filter noise bandwidth and $$F\left(\frac{S}{N}; W; f_0\right)$$

is the function of S/N, W, and $f_0$.

It may now be stated that $$F\left(\frac{S}{N}\right) = \left(\frac{S^2}{N} + e_{BDI}^2\right)^{1/2} \text{ or } F'\left(\frac{S}{N}\right) = \left(\frac{S}{N} + |e_{BDI}|\right).$$

For a small angle of arrival B and neglecting the gain constants and further that $(\sin \pi WT)/\pi WT \approx 1$ then, $$F\left(\frac{S}{N}\right) \approx \left[\left[\left(\sin^{-1}\left[\left(\frac{S}{S+N}\right)\cos 2\pi f_0 T\right]\right)\right]^2 + \left[\sin^{-1}\left[\left(\frac{S}{S+N}\right)\sin 2\pi f_0 T\right]\right]^2\right]^{1/2}$$

Alternatively, $$F'\left[\frac{S}{N}\right] \approx \left[\sin^{-1}\left[\left(\frac{S}{S+N}\right)\cos 2\pi f_0 T\right] + \left|\sin^{-1}\left[\left(\frac{S}{SN}\right)\sin 2\pi f_0 T\right]\right|\right]$$

The first representation i.e., $$F\left(\frac{S}{N}\right)$$

is best for $(S/N) \ll 1$. The second representation is best for $(S/N) \gg 1$.

If we consider the low S/N case and the expansion of $\sin^{-1}$ of $$x = x + \frac{x^3}{\sigma} + \frac{3x^5}{40} +$$

considering only the first term of this series then $$F\left(\frac{S}{N}\right) \approx \left(\frac{S}{S+N}\right)$$

Since this function is represented by a voltage level used to control the gain of amplifier 52, this removes the S/N dependence of the mean voltage level.

CONCLUSION

An apparatus for measuring sea bottom slope has been described in which the sea bottom is illuminated by split or half acoustic beams. The angle of arrival of incident echos upon the apparatus is taken as being proportional to the slope. A bearing deviation indicator is used for extracting a signal proportional to phase angle and sign. Simultaneously a signal-to-noise average is taken. The effects of signal-to-noise fluctuation upon the BDI signal are removed or substantially reduced by summing the absolute value of the BDI signal with the average signal-to-noise ratio and with this combined signal varying the gain of an output amplifier responsive to the $e_{BDI}$ output signal.

I claim:

1. In a sea bottom slope measuring apparatus comprising:
    means for projecting acoustic energy toward the sea bottom with reference to a local vertical; and
    means responsive to sea bottom acoustic echoes for deriving a first signal varying as the arrival angle between the incident echoes and the local vertical;
    wherein the improvement comprises:
        means for deriving from the incident echoes a second signal varying as the average signal-to-noise ratio thereof; and
        means responsive to the first and second signal magnitudes for generating an output signal proportional to the sea bottom slope corrected with respect to signal-to-noise variations.

2. A sea bottom slope measuring apparatus comprising:
    means for projecting an acoustic beam with reference to a local vertical;
    means for forming a first and a second receiving beam having a pair of phase centers separated by a predetermined distance for each orthogonal component of sea bottom slope being measured;
    means for generating a first signal which varies as the phase angle between coherent first and second receiving beams;
    means for generating a second signal which varies as the average signal-to-noise ratio of the coherent first and second receiving beams; and
    a utilization circuit responsive to the first and second signal magnitudes for generating an output signal proportional to sea bottom slope corrected with respect to signal-to-noise variations.

3. A sea bottom slope measuring apparatus according to claim 2, wherein the utilization circuit further comprises means for displaying the second signal magnitude.

4. A sea bottom slope measuring apparatus comprising;
means for projecting an acoustic beam upon the sea bottom with reference to a local vertical;
means for forming a first and a second receiving beam having a pair of phase centers separated by a predetermined distance for each orthogonal component of sea bottom slope being measured;
first correlation means for generating a first signal varying as the phase angle between coherent first and second receiving beams;
second correlation means for generating a second signal varying as the average signal-to-noise ratio of the coherent first and second receiving beams;
means for summing the absolute first signal magnitude to the second signal magnitude; and
a variable gain amplifier responsive to the first signal magnitude and whose gain varies inversely as the sum signal varies.

5. A sea bottom slope measuring apparatus according to claim 4, wherein the first correlation means comprises:
means for shifting the phase a predetermined amount between the first and second receiving beams;
a cross-correlator terminating the phase shifting means; and
an integrator coupling the cross-correlator output.

6. A sea bottom slope measuring apparatus according to Claim 4, wherein the second correlation means comprises:
a cross-correlator terminating the first and second input receiving beams; and
an integrator coupling the cross-correlator output.

7. A sea bottom slope measuring apparatus according to Claim 4, wherein the means for forming a first and second receiving beam comprises:
a receiving transducing array;
a plurality of amplifiers individually coupling corresponding elements of the transducing array; and
a beam forming and stabilization network terminating the amplifiers.

8. In a sea bottom slope measuring apparatus having means for projecting an acoustic energy beam toward the sea bottom with reference to a local vertical, and further including means responsive to sea bottom acoustic echoes for deriving a first signal varying as the arrival angle between the incident echoes and the local vertical, the improvement comprising:
means for deriving a second signal from the incident acoustic echoes varying as the average signal-to-noise ratio thereof;
means for summing the absolute first signal magnitude with the second signal magnitude; and
means for generating an output signal responsive to the first signal magnitude and having a gain characteristic varying inversely as the sum signal varies.

9. In combination:
means for radiating a beam in a predetermined direction;
means for forming a first and a second receiving beam having a pair of phase centers separated by a predetermined distance for orthogonal components of a target orientation with respect to said direction;
means for generating a first signal which varies as the phase angle between coherent first and second receiving beams;
means for generating a second signal which varies as the average signal-to-noise ratio of the coherent first and second receiving beams; and
a utilization circuit responsive to the first and second signal magnitudes for generating an output signal which varies as a function of the orientation of said target corrected with respect to signal-to-noise variations.

10. The combination according to claim 9, wherein the utilization circuit further comprises means for displaying said output signal.

11. In combination:
means for projecting a radiated beam in a predetermined direction toward a target;
means for forming a first and a second receiving beam having a pair of phase centers separated by a predetermined distance for each orthogonal component of the orientation of said target with respect to said predetermined direction;
first correlation means for generating a first signal varying as the phase angle between coherent first and second receiving beams;
second correlation means for generating a second signal varying as the average signal-to-noise ratio of the coherent first and second receiving beams; and
means for summing the absolute first signal magnitude to the second signal magnitude.

12. The combination in accordance with claim 11, wherein a signal derived from the output of said summing means is amplified by a variable gain amplifier responsive to said first signal magnitude and whose gain varies inversely with said sum signal.

13. The combination in accordance with claim 12, wherein the first correlation means comprises:
means for shifting the phase a predetermined amount between the first and second receiving beams;
a cross-correlator fed by the phase shifting means; and
an integrator fed by said correlator.

* * * * *